(12) United States Patent
Leigh et al.

(10) Patent No.: US 8,864,388 B2
(45) Date of Patent: Oct. 21, 2014

(54) FACEPLATE APPARATUS AND SYSTEM FOR COUPLING TO AN ELECTRONIC DEVICE

(75) Inventors: Kevin B. Leigh, Houston, TX (US);
George D. Megason, Spring, TX (US);
Guodong Zhang, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 106 days.

(21) Appl. No.: 13/460,986

(22) Filed: May 1, 2012

(65) Prior Publication Data

US 2013/0294730 A1    Nov. 7, 2013

(51) Int. Cl.
*G02B 6/36* (2006.01)
*H01R 13/627* (2006.01)

(52) U.S. Cl.
CPC ........ *H01R 13/6271* (2013.01); *H01R 13/6275* (2013.01)
USPC ................................ 385/53; 385/88; 439/373

(58) Field of Classification Search
CPC ..................... H01R 13/6275; H01R 13/6271
USPC ............... 385/88, 135, 53; 439/265–267, 373
See application file for complete search history.

(56) References Cited

U.S. PATENT DOCUMENTS

| | | | |
|---|---|---|---|
| 6,176,738 B1 | 1/2001 | Consoli et al. | |
| 6,234,817 B1 | 5/2001 | Hwang | |
| 7,500,862 B1 | 3/2009 | Herring et al. | |
| 8,025,458 B2 | 9/2011 | Musil et al. | |
| 8,086,085 B2 | 12/2011 | Lu et al. | |
| 8,199,511 B2 * | 6/2012 | Kim et al. | 361/737 |
| 8,622,762 B2 * | 1/2014 | Van Swearingen et al. | 439/248 |
| 2006/0285807 A1 * | 12/2006 | Lu et al. | 385/92 |
| 2011/0013367 A1 | 1/2011 | Williams et al. | |
| 2012/0200979 A1 * | 8/2012 | Miller et al. | 361/119 |
| 2013/0071064 A1 * | 3/2013 | Rosenberg et al. | 385/49 |

* cited by examiner

*Primary Examiner* — Ellen Kim

(57) ABSTRACT

A system includes an external faceplate including a blind-mate connector and a swing arm removably connected to the blind-mate connector. The swing arm secures the blind-mate connector to an electronic device.

14 Claims, 3 Drawing Sheets

FACEPLATE APPARATUS AND SYSTEM FOR COUPLING TO AN ELECTRONIC DEVICE

BACKGROUND

Switch modules may connect incoming and outgoing cables of a network of electronic devices such as a local area network ("LAN"). Switch modules not only connect network nodes, but connect the network to the Internet or another network. The use of switch modules allows for moving individual electronic devices to different groups in the network by disconnecting cables and reconnecting them elsewhere on the same or other switch modules. Also, switch modules need to be serviced where the cables attached to them need to be removed and reinstalled.

BRIEF DESCRIPTION OF THE DRAWINGS

For a detailed description of various examples, reference will now be made to the accompanying drawings in which.

DETAILED DESCRIPTION

Often, electronic devices have a faceplate for external cables to couple the electronic devices to other electronic devices. Electronic devices may comprise switches, other networking elements, data processor devices, data storage devices, servers, blades, etc. Removing external cables from the faceplates is time consuming and error prone (e.g., an incorrect cable is removed or a cable is inadvertently knocked loose), and the external cables should be removed prior to each servicing of the electronic devices. After service is complete, the external cables should be reinstalled, which introduces another opportunity for error such incorrect cables being installed and more possibility for inadvertent loosening.

This invention describes "blind-mate faceplate" connectors, mounted on an external faceplate, to bridge the external cables and electronic devices. The word "external" is with respect to the electronic device. A blind-mate faceplate connector assembly has blind-mate connectors on one side of the external faceplate to blind-mate an electronic device, and external cable connectors on the other side of the external faceplate to manually mate external cables Blind-mate connectors allow higher density connectivity compared to commonly used faceplate connectors. Blind-mate faceplate connectors have multiple advantages. First, electronic devices can be serviced without removing the external cables. Next, blind-mate connectors allows high-density signals which in turns allows for high-density external cable connectors to be used to couple the external faceplate with high-density external cables, which are more cost efficient than commonly used low-density cables. Also, the external cables can be pre-installed and tested before the electronic devices are installed enabling faster installation time.

Figure 1:
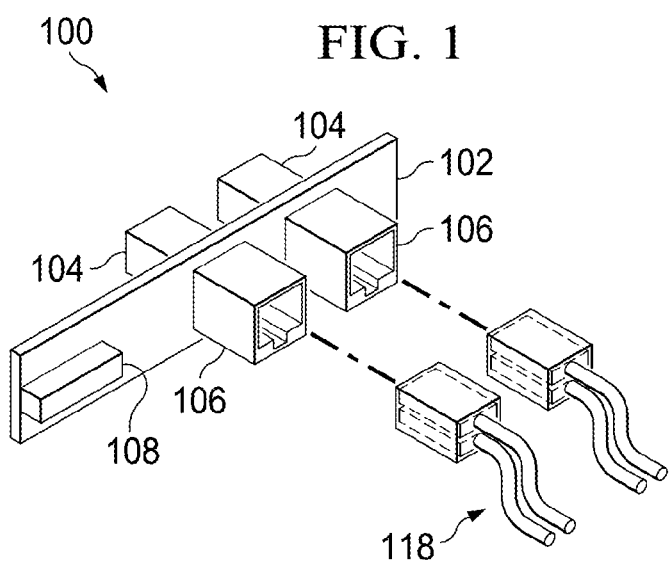
FIG. 1 illustrates an external faceplate in accordance with at least some examples.

FIG. 1 illustrates an external faceplate apparatus 100 in accordance with at least some examples. The apparatus 100 may comprise an external faceplate 102 rigidly attached to a frame, for example a rack frame (not shown). The external faceplate 102 may be coupled to blind-mate connectors 104. The blind-mate connectors 104 may comprise alignment features that allow for automatic alignment of the blind-mate connectors when mating and unmating with compatible connectors on the electronic devices. For example, the blind-mate connectors 104 may comprise guide rails, chamfered edges, pins, sockets, etc. that allow for automatic alignment of the blind-mate connectors when mating and unmating with compatible connectors on the electronic devices. The blind-mate connectors 104 may help transfer data to and from an electronic device in at least some examples.

The external faceplate 102 may also be coupled to external cable connectors 106 in at least some examples. The external cable connectors 106 may removably couple to external cables 118 such as optical fiber cables or other network cables. The external cable connectors 106 may help transfer data to and from nodes external to the electronic device in at least some examples. The external faceplate may couple to an external cable 118 via the external cable connectors 106 prior to coupling with the electronic device via the blind-mate connectors 104, and the external cables 118 need not be removed from the external cable connectors 106 when the electronic device is uninstalled or removed for servicing. As such, human errors such as misconnecting cables, knocking a connector loose, etc. can be minimized. Additionally, all cables can be connected to the external cable connectors 106 out of the sometimes cramped confines near the electronic device. Only coupling of the blind-mate connectors 104 needs to occur near the electronic device. In at least one example, a human installer may pre-connect many external cables 118 to the removed faceplate 102 while seated at a work bench and then install the faceplate (for example, in a rack), resulting in fewer errors than if the human installer were forced to connect the external cables 118 through a tangle of wires at the electronic device. The external cable connectors 106 may be coupled to the external faceplate 102 on an opposite side of the blind-mate connector 104 in at least one example.

In at least one example, the external faceplate 102 of FIG. 1 may comprise a blind mate connector 104, and the external faceplate 102 may couple to a swing arm to secure the blind mate connector 104 to an electronic device. The external faceplate 102 may also couple to an attachment element 108 as discussed with regard to FIG. 3 below.

Figure 2:
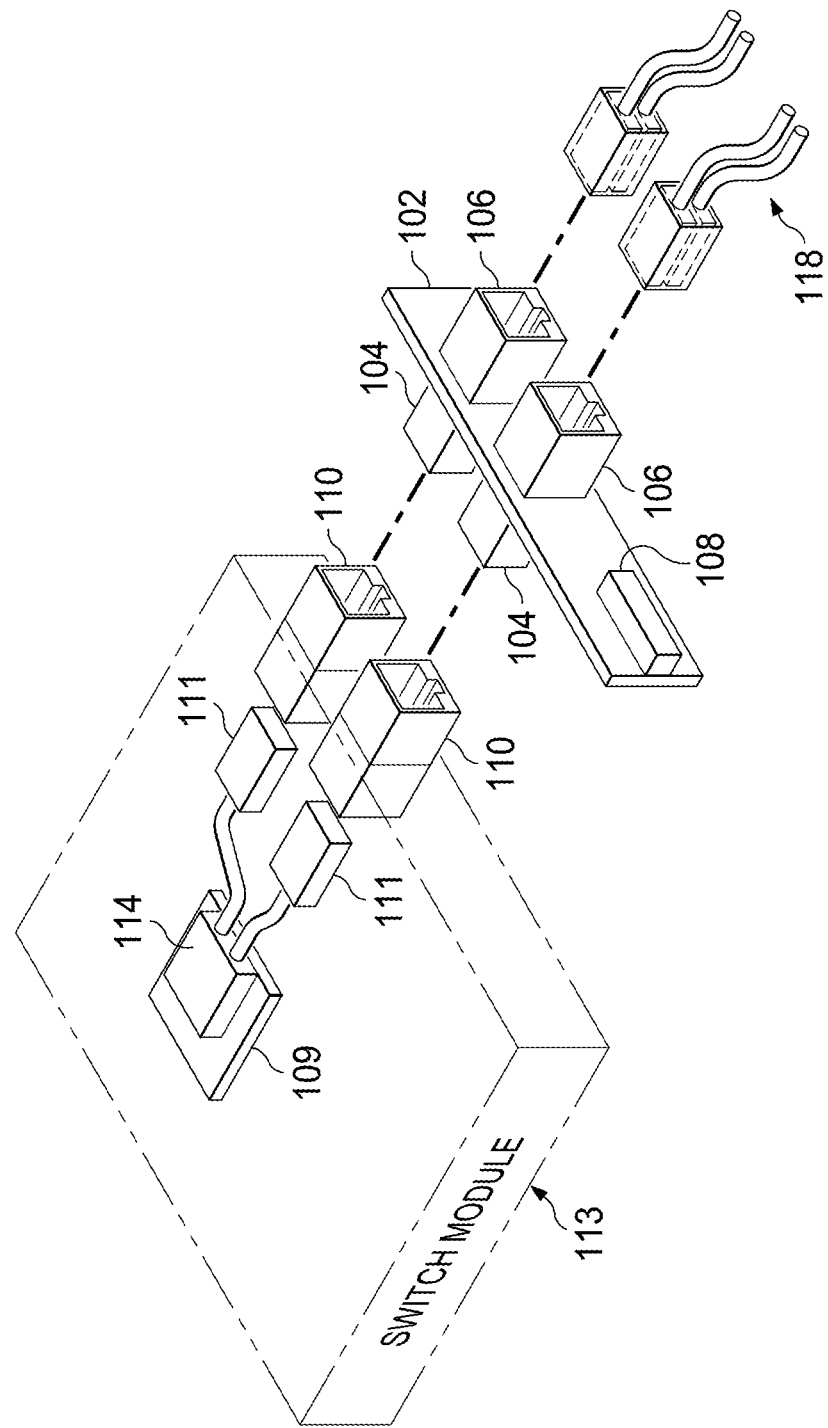
FIG. 2 illustrates the external faceplate and an electronic device in accordance with at least some examples.
Figure 3:
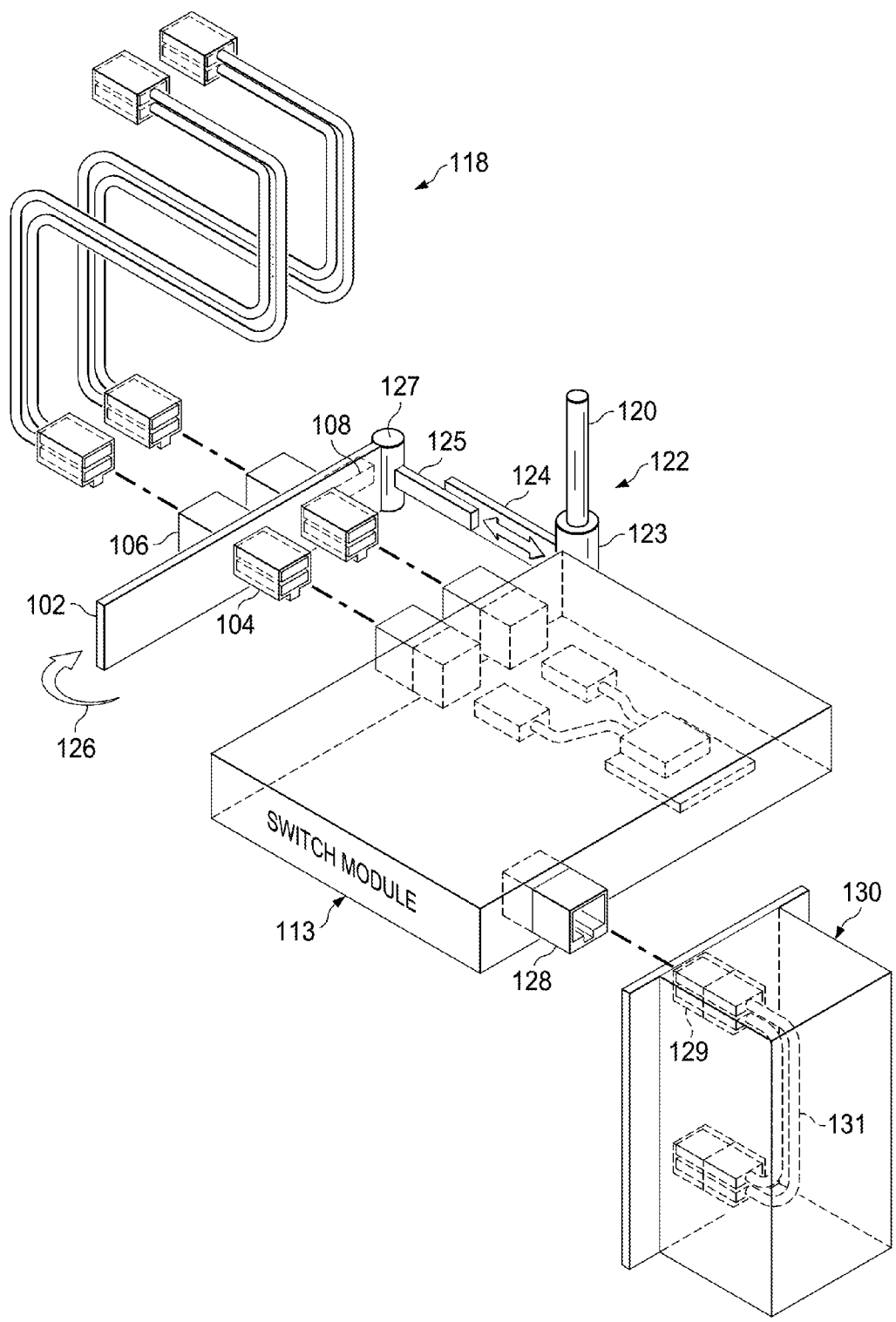
FIG. 3 illustrates the external faceplate, the electronic device, and a swing arm in accordance with at least some examples.

FIG. 2 illustrates the external faceplate 102 and an electronic device 113 in accordance with at least some examples. In the examples of FIGS. 2 and 3, the electronic device 113 is a switch labeled "switch module." However, in other examples, electronic devices 113 may comprise other networking elements, data processor devices, data storage devices, servers, blades, etc. The electronic device 113 may comprise an electrical/optical conversion engine 114 that converts electrical signals to optical signals and converts optical signals to electrical signals. The electrical/optical conversion engine 114 may be mounted on mount 109 in at least one example, and may comprise pig-tail terminated ferrules 111 for transferring signals to and from the electrical/optical conversion engine 114. In various other examples, the external cable connector 106 or the blind-mate connector 104 may comprise the electrical/optical conversion engine 114. If low-density or standard cables are required to be coupled to external cable connectors 106, electrical to optical and optical to electrical conversions may occur on a powered faceplate 102. For example, a power source may connect to the external faceplate 102 to power the conversion engine.

The electronic device 113 may comprise compatible connectors 110 removably coupled to blind-mate connectors 104. As such, the faceplate 102 may be decoupled from the electronic device 113 without decoupling external cables 118 from external cable connectors 106. Also, external cables 118 may be coupled to external cable connectors 106 prior to blind-mate connectors 104 coupling to compatible connectors 110. Accordingly, connection mistakes can be mitigated because numerous external cable connections need not be disconnected prior to servicing the electronic device 113 and reconnected after servicing the electronic device 113.

FIG. 3 illustrates the external faceplate 102, the electronic device 113, and a swing arm 122 in accordance with at least some examples. The external faceplate 102 may be removably coupled to a swing arm 122 to secure the blind-mate connectors 104 and external faceplate 102 to the electronic device 113. In at least one example, the swing arm 122 may comprise a first hinge 123 coupled to a securing arm 124. The securing arm 124 may rotate about the first hinge 123 and comprise an extendible portion 125 that extends away from the hinge. The extendible portion 125 may extend and retract thus lengthening and shortening securing arm 124. The swing arm 122 may comprise a lock to prevent the securing arm 124 from rotating about the first hinge 123 or prevent the extendible portion 125 from extending or retracting. When unlocked, the securing arm 124 may rotate freely about the first hinge 123 or the extendible portion 125 may extend and retract freely, respectively. The external faceplate and the extendible portion 125 may be connected via a second hinge 127, so that the external faceplate 102 along with the external cables 118 can be swung in the direction of arrow 126. The external cables 118 may be secured on the swing arm 122 using tie wraps or mechanical straps. As such, the swing arm 122 may be locked during operation of the electronic device 113, and unlocked so that the external faceplate 102 may be swung away on the second hinge 127 and in the direction of arrow 126 for the electronic device 113 to be removed or uninstalled for servicing. Specifically, the swing arm 122 allows the external faceplate 102 to be decoupled from the electronic device 113 to allow for removal of the electronic device 113. In at least one example, the swing arm 122 may comprise a plurality securing arms to secure a plurality of corresponding external faceplates against a plurality of corresponding electronic devices.

The external faceplate 102 may comprise an attachment element 108 to couple to the swing arm 122. Specifically, in at least one example, the securing arm 124 removably couples to the attachment element 108 of the external faceplate 102. The attachment element 108 is obscured in FIG. 3 because the external faceplate is reversed in the direction of arrow 126. The attachment element 108 may comprise a mechanical fastener to couple to the swing arm. For example, the mechanical fastener may include a sheath into which the securing arm 124 and extendible portion 125 extends. The mechanical fastener may include a hook or latch to which the securing arm 124 and extendible portion fasten. In another example, the attachment element may comprise an adhesive to couple to the swing arm. For example, the attachment element may include adhesives such as glue, tape, or items with similar chemical compounds to adhere to securing arm 125.

In at least one example, when the electronic device 113 is serviced, the blind-mate connectors 104 are decoupled from the electronic device 113, but the external faceplate 102 remains on the swing arm 124 and the securing arm 124 is rotated about the first hinge 123 and/or the second hinge 127 so that the electronic device 113 may be uninstalled. After the electronic device 113 is reinstalled, the blind-mate connectors 104 are coupled to the electronic device 113 by rotating the securing arm 124 about the first hinge 123 and/or the second hinge 127 in the opposite direction. The external cables 118 and external cable connectors 106 are not decoupled from the faceplate 102 during servicing of the electronic device 113.

In at least one example, the external faceplate 102 may removably couple to the electronic device 113 on an opposite side of the electronic device 113 that couples to the backplane. Specifically, backplane connector 128 couples the electronic device 113 to the backplane and other electronic devices coupled to the backplane via mating with a backplane compatible connector 129. In at least one example, the backplane compatible connector 129 is also a blind-mate connector. A portion of the backplane compatible connector 129 and corresponding backplane cable 131 may be housed in a casing 130 to prevent accidental disconnection. Similarly, the external cable connectors 106, in whole or in portion, may be housed in a casing with the external cables 118 to prevent loose connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising,
an external faceplate comprising a blind-mate connector and an external cable connector, the external faceplate to couple to a swing arm to secure the blind-mate connector to an electronic device,
wherein the blind-mate connector is coupled to an opposite side of the external faceplate than the external cable connector,
wherein the blind-mate connector comprises an alignment feature to enable automatic alignment of the blind-mate connector during mating and unmating with a compatible connector on the electronic device, and
wherein the external cable connector is removably coupleable to an external cable.

2. The system of claim 1, the blind-mate connector comprising an electrical or optical connector.

3. The system of claim 1, the external cable connector comprising one of an electrical and an optical connector.

4. The system of claim 1, the external faceplate to removably couple to the electronic device on an opposite side of a side on which the electronic device couples to a backplane.

5. An apparatus, comprising:
an external faceplate comprising:
a blind-mate connector to couple to an electronic device, the blind-mate connector comprising an alignment feature to enable automatic alignment of the blind-mate connector during mating and unmating with a compatible connector on the electronic device;
an external cable connector removably coupleable to an external cable, the external cable connector being coupled to an opposite side of the external faceplate than the blind-mate connector; and
an attachment element to couple the external faceplate to a swing arm to secure the blind-mate connector to the electronic device.

6. The apparatus of claim 5, the external cable connector comprising an electrical to optical conversion engine.

7. The apparatus of claim 5, the external cable connector coupled to at least one external cable when the electronic device is uninstalled.

8. A system comprising,
an external faceplate comprising a blind-mate connector and an external cable connector removably coupleable to an external cable, wherein the blind-mate connector comprises an alignment feature to enable automatic alignment of the blind-mate connector during mating and unmating with a compatible connector on the electronic device, and wherein the blind-mate connector is coupled to an opposite side of the external faceplate than the external cable connector; and
a swing arm coupled to the external faceplate to secure the external faceplate to an electronic device.

9. The system of claim 8, the swing arm comprising a first hinge coupled to a securing arm.

10. The system of claim 9, the securing arm rotating about the first hinge and comprising an extendible portion that extends away from the hinge.

11. The system of claim 8, the swing arm comprising a securing arm removably coupled to an attachment element of the external faceplate.

12. The system of claim 8, the swing arm comprising a second hinge coupled to a securing arm, the swing arm comprising a lock to prevent the securing arm from rotating about a hinge.

13. The system of claim 8, the external cable connector coupled to at least one external cable when the electronic device is uninstalled.

14. The system of claim 8, the external cable connector comprising an electrical or optical connector.

* * * * *